(12) United States Patent  
Nagase et al.

(10) Patent No.: US 8,991,996 B2
(45) Date of Patent: Mar. 31, 2015

(54) INK COMPOSITION FOR INK JET RECORDING

(71) Applicant: Seiko Epson Corporation, Toyko (JP)

(72) Inventors: Makoto Nagase, Shiojiri (JP); Akihito Sao, Matsumoto (JP); Kenichiro Kubota, Matsumoto (JP); Kenichi Numakura, Azumino (JP); Jun Ito, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/274,052

(22) Filed: May 9, 2014

(65) Prior Publication Data

US 2014/0333696 A1    Nov. 13, 2014

(30) Foreign Application Priority Data

May 9, 2013   (JP) .................................. 2013-099070
Jan. 22, 2014 (JP) .................................. 2014-009249

(51) Int. Cl.
   *B41J 2/02*    (2006.01)
   *C09D 11/36*   (2014.01)
   *B41J 2/01*    (2006.01)

(52) U.S. Cl.
   CPC .. *C09D 11/36* (2013.01); *B41J 2/01* (2013.01)
   USPC .......................................... 347/100; 106/36.1

(58) Field of Classification Search
   None
   See application file for complete search history.

(56) References Cited

U.S. PATENT DOCUMENTS

| 7,690,780 | B2 * | 4/2010 | Kato ............................. 347/100 |
| 7,829,607 | B2 * | 11/2010 | Ushiku ......................... 523/160 |
| 8,613,509 | B2 * | 12/2013 | Nagase et al. ................ 347/100 |
| 2011/0315049 | A1 | 12/2011 | Aoki et al. |

FOREIGN PATENT DOCUMENTS

| JP | 2010-018730 A | 1/2010 |
| JP | 2012-012432 A | 1/2012 |
| JP | 2012-046671 A | 3/2012 |

\* cited by examiner

*Primary Examiner* — Lamson Nguyen
(74) *Attorney, Agent, or Firm* — Nutter McClennen & Fish LLP; John J. Penny, Jr.

(57) ABSTRACT

The ink composition for ink jet recording according to the invention includes a coloring material, a cyclic ester, a first organic solvent having a flash point of 70° C. or less and represented by Formula (I):

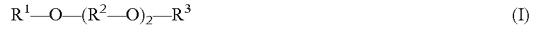

$$R^1\text{—O—}(R^2\text{—O})_2\text{—}R^3 \qquad (I)$$

(wherein, $R^1$ represents an alkyl group having 1 to 4 carbon atoms; $R^2$ represents an ethylene group or a propylene group; and $R^3$ represents a hydrogen atom or an alkyl group having 1 to 4 carbon atoms), and a second organic solvent having a flash point of 90° C. or more. The cyclic ester has a content "a" (% by mass) of 6% by mass or more and 30% by mass or less. The content "a" (% by mass) of the cyclic ester, the content "b" (% by mass) of the first organic solvent, and the content "c" (% by mass) of the second organic solvent satisfy a relationship represented by Expressions (1) and (2):

$$a<b \qquad (1)$$

$$c<(a+b)/2 \qquad (2).$$

15 Claims, 1 Drawing Sheet

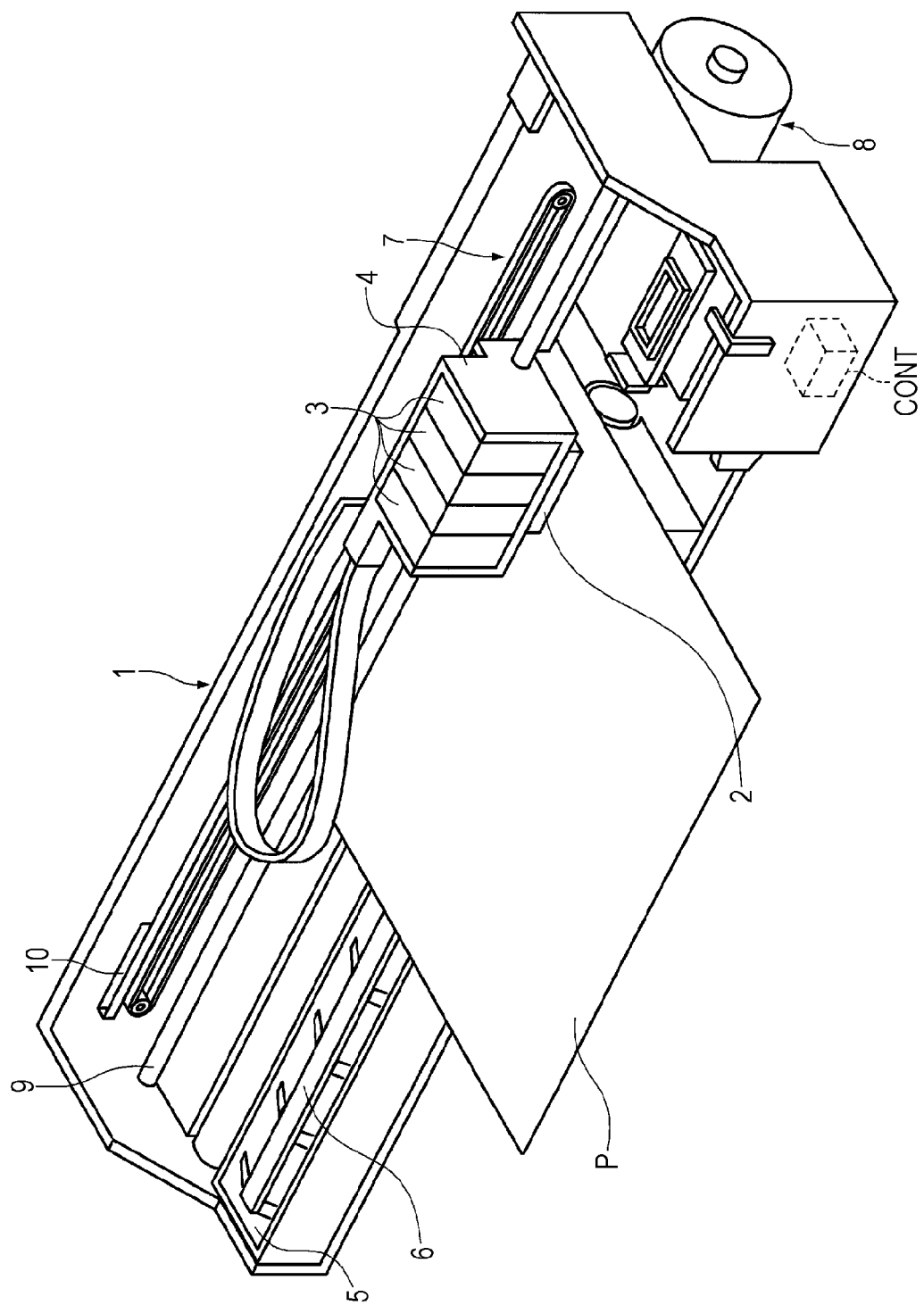

INK COMPOSITION FOR INK JET RECORDING

BACKGROUND

1. Technical Field

The present invention relates to an ink composition for ink jet recording.

2. Related Art

There is known an ink jet recording apparatus performing recording of images and letters by discharging minute droplets of an ink composition from nozzle holes of a recording head and allowing the ink composition to adhere to a recording medium. As the ink composition used in such ink jet recording, for example, an ink composition containing various components such as a coloring material, a surfactant, water, and an organic solvent is known. A substantially water-free oily (nonaqueous) ink composition has also been developed.

In ink jet recording, a variety of performances are required in each of the components such as an ink set, an ink composition, a recording apparatus, and a recording medium, and an advanced balance among these components is also required.

For example, JP-A-2012-012432, JP-A-2012-046671, and JP-A-2010-018730 propose technologies for improving the drying property of an ink composition after recording on a recording medium. JP-A-2012-012432 discloses an ink composition containing a hydrocarbon solvent, a solvent having an ester group and an ether group, and a solvent soluble in both solvents. JP-A-2012-046671 discloses an ink composition including an amide solvent (an ether amide). JP-A-2010-018730 discloses an ink composition including three types of alcohols having different boiling points. These patent documents describe that in the above-mentioned oily ink compositions, the drying properties after printing on recording media are improved.

However, the ink composition in JP-A-2012-012432 contains a hydrocarbon solvent, and the ink composition in JP-A-2010-018730 contains alcohols. Consequently, in these ink compositions, the solubility of the resin blended as a fixing agent may be insufficient. In such a case, even if the drying property can be improved, there are risks of deterioration of physical properties of the ink composition owing to, for example, precipitation of the resin, a difficulty of securing the abrasion resistance of recorded matter, and restriction in selection of the resin for fixing. In the technology disclosed in JP-A-2012-046671, in the case of adding an ether amide to an aqueous ink composition, an improvement in drying property can be expected. However, since the ether amide itself is hygroscopic, in the case of adding an ether amide to a non-aqueous ink composition (oily ink composition), the drying property may rather decrease.

However, even in a case of using a solvent that can improve the drying property, if the drying property is too high, the solvent of the ink droplets adhered onto a recording medium may evaporate before sufficient wet-spreading of the ink. In such a case, the dot size of the ink droplets adhered onto a recording medium is small, and thereby the filling of the image with aggregates of a plurality of ink droplets becomes worse to cause occurrence of linear unevenness in the resulting image, resulting in a reduction in image quality.

SUMMARY

Some aspects of the invention is to provide an ink composition for ink jet recording that can form an image having excellent abrasion resistance and can improve both the drying property and the image quality of the recorded image by solving at least a part of disadvantages described above and to provide an ink jet recording method.

An advantage of some aspects of the invention is to solve at least a part of disadvantages described above, and the invention can be realized as the following aspects or application examples.

Application Example 1

An embodiment of the ink composition for ink jet recording according to the invention includes: a coloring material, a cyclic ester, a first organic solvent having a flash point of 70° C. or less and represented by Formula (I):

(wherein, $R^1$ represents an alkyl group having 1 to 4 carbon atoms; $R^2$ represents an ethylene group or a propylene group; and $R^3$ represents a hydrogen atom or an alkyl group having 1 to 4 carbon atoms), and a second organic solvent having a flash point of 90° C. or more, wherein the cyclic ester has a content "a" (% by mass) of 6% by mass or more and 30% by mass or less; and the content "a" (% by mass) of the cyclic ester, the content "b" (% by mass) of the first organic solvent, and the content "c" (% by mass) of the second organic solvent satisfy a relationship represented by Expressions (1) and (2):

$$a < b \tag{1}$$

$$c < (a+b)/2 \tag{2}$$

Application Example 2

In application example 1, the content "c" of the second organic solvent can be 7% by mass or more and 30% by mass or less.

Application Example 3

In application example 1 or 2, the content "b" of the first organic solvent can be 20% by mass or more and 60% by mass or less.

Application Example 4

In any one of application examples 1 to 3, the second organic solvent can be a compound represented by Formula (II):

(wherein, $R^4$ represents an alkyl group having 1 to 6 carbon atoms; $R^5$ represents an ethylene group or a propylene group; $R^6$ represents a hydrogen atom or an alkyl group having 1 to 6 carbon atoms; and n represents an integer of 2 to 6).

Application Example 5

In any one of application examples 1 to 4, the content of water can be 3% by mass or less.

Application Example 6

In any one of application examples 1 to 5, a relationship represented by Expression (3):

$$a < c \tag{3}$$

can be satisfied.

Application Example 7

An embodiment of the ink jet recording method according to the invention includes steps of discharging an ink composition according to any one of application examples 1 to 6 from a recording head and allowing the ink composition to adhere onto a recording medium.

Application Example 8

In application example 7, in the step of allowing the ink composition to adhere onto a recording medium, the recording medium can be heated at 40° C. or more and 50° C. or less.

Application Example 9

In application example 7 or 8, the recording can be performed in an environment with a humidity of 50% RH or more.

BRIEF DESCRIPTION OF THE DRAWING

The invention will be described with reference to the accompanying drawing, wherein like numbers reference like elements.

FIG. 1 is a perspective view illustrating a structure of an ink jet printer that can be used in an embodiment of the invention.

DESCRIPTION OF EXEMPLARY EMBODIMENTS

Some embodiments of the invention will now be described. The embodiments described below are merely examples of the invention. It is apparent that the invention is not limited to the following embodiments and includes various modifications made within the scope not changing the gist of the invention. Note that all the components described below are not necessarily indispensable for the invention.

In the invention, the term "image" refers to a recorded pattern formed by groups of dots and includes text recording and solid recording.

1. Ink Composition

The ink composition for ink jet recording (hereinafter, also simply referred to as "ink composition") according to the embodiment contains a coloring material, a cyclic ester, a first organic solvent, and a second organic solvent. The cyclic ester, the first organic solvent, and the second organic solvent are solvent components in the ink composition.

1.1. Coloring Material

The ink composition according to the embodiment contains a coloring material. The coloring material may be a known dye or a known organic or inorganic pigment. Among these coloring materials, pigments are preferred from the viewpoint of light resistance. Examples of the pigment that can be contained in the ink composition of the embodiment include azo pigments such as azo lake, insoluble azo pigments, condensed azo pigments, and chelate azo pigments; polycyclic pigments such as phthalocyanine pigments, perylene and perylene pigments, anthraquinone pigments, quinacridone pigments, dioxazine pigments, thioindigo pigments, isoindolinone pigments, and quinophthalone pigments; dye lakes such as basic dye lakes and acid dye lakes; organic pigments such as nitro pigments, nitroso pigments, aniline black, and daylight fluorescent pigments; and inorganic pigments such as carbon black. These pigments can be used alone or in combination thereof.

The ink composition according to the embodiment may be an ink of black, white, cyan, blue, green, magenta, red, yellow, or orange, an ink of a light color, deep color, or mixed color of these colors, or an ink of a luster color.

When the ink composition of the embodiment is a magenta or red ink, examples of the coloring material, in particular, the pigment, blended in the ink composition include C.I. Pigment red 2, C.I. Pigment red 3, C.I. Pigment red 5, C.I. Pigment red 6, C.I. Pigment red 7, C.I. Pigment red 15, C.I. Pigment red 16, C.I. Pigment red 48:1, C.I. Pigment red 53:1, C.I. Pigment red 57:1, C.I. Pigment red 122, C.I. Pigment red 123, C.I. Pigment red 139, C.I. Pigment red 144, C.I. Pigment red 149, C.I. Pigment red 166, C.I. Pigment red 170, C.I. Pigment red 177, C.I. Pigment red 178, C.I. Pigment red 194, C.I. Pigment red 209, C.I. Pigment red 222, and C.I. Pigment red 224. These pigments can be used alone or in combination thereof.

When the ink composition of the embodiment is an orange or yellow ink, examples of the coloring material, in particular, the pigment, blended in the ink composition include C.I. Pigment orange 31, C.I. Pigment orange 43, C.I. Pigment orange 64, C.I. Pigment yellow 12, C.I. Pigment yellow 13, C.I. Pigment yellow 14, C.I. Pigment yellow 15, C.I. Pigment yellow 17, C.I. Pigment yellow 74, C.I. Pigment yellow 93, C.I. Pigment yellow 94, C.I. Pigment yellow 128, C.I. Pigment yellow 138, C.I. Pigment yellow 150, C.I. Pigment yellow 154, C.I. Pigment yellow 155, and C.I. Pigment yellow 180. These pigments can be used alone or in combination thereof.

When the ink composition of the embodiment is a green or cyan ink, examples of the coloring material, in particular, the pigment, blended in the ink composition include C.I. Pigment blue 15, C.I. Pigment blue 15:2, C.I. Pigment blue 15:3, C.I. Pigment blue 16, C.I. Pigment blue 60, C.I. Pigment green 7, and C.I. Pigment green 36. These pigments can be used alone or in combination thereof. When the ink composition of the embodiment is a black ink, examples of the coloring material blended in the ink composition include carbon black. When the ink composition of the embodiment is a white ink, examples of the coloring material blended in the ink composition include Pigment White 6, 18, and 21. The ink composition of the embodiment may contain a luster pigment such as metal particles, metal foil, or an inorganic salt, as a coloring material.

The content of the coloring material in the ink composition of the embodiment is not particularly limited and is preferably 0.01% by mass or more and 25% by mass or less, more preferably 0.1% by mass or more and 10% by mass or less, more preferably 0.5% by mass or more and 15% by mass or less, and most preferably 1% by mass or more and 10% by mass or less based on the total mass of the ink composition.

When the ink composition according to the embodiment contains a pigment as the coloring material, the ink composition can contain a dispersant that is usually added to ink compositions, from the viewpoint of improving dispersion stability. Examples of the dispersant include polyester-based polymers such as Hinoact series KF1-M, T-6000, T-7000, T-8000, T-8350P, and T-8000E (manufactured by Takefu Fine Chemicals Co., Ltd.); and Solsperse series 20000, 24000, 32000, 32500, 33500, 34000, 35200, and 37500 (manufactured by LUBRIZOL Corporation), Disperbyk series 161, 162, 163, 164, 166, 180, 190, 191, and 192 (manufactured by BYK-Chemie GmbH), Flowlen series DOPA-17, 22, 33, and G-700 (manufactured by Kyoeisha Chemical Co., Ltd.), Ajisper series PB821 and PB711 (manufactured by Ajinomoto Co., Ltd.), and LP series 4010, 4050, and 4055 and POLYMER series 400, 401, 402, 403, 450, 451, and 453 (manufactured by EFKA Chemicals B.V.).

When the ink composition according to the embodiment contains a dispersant, the content of the dispersant can be appropriately selected depending on the pigment contained in the ink composition and is preferably 5 parts by mass or more and 200 parts by mass or less and more preferably 30 parts by mass or more and 120 parts by mass or less based on 100 parts by mass of the pigment in the ink composition.

1.2. Solvent

1.2.1. Cyclic Ester

The ink composition according to the embodiment contains a cyclic ester as a solvent. This allows the ink composition to penetrate into the inside of a recording medium by dissolving a part of the recording surface (preferably a recording surface containing a vinyl chloride resin). The penetration of the ink composition into the inside of the recording medium can improve the abrasion resistance (friction fastness) of an image recorded on the recording medium. Thus, since the cyclic ester has high permeability into a recording medium, an image having excellent abrasion resistance can be obtained even in a high-humidity environment.

The cyclic ester is a compound having a structure formed by dehydration condensation between a hydroxyl group and a carboxyl group of one molecule. The cyclic ester has a heterocycle including two or more carbon atoms and one oxygen atom and has a structure containing a carbonyl group adjacent to the oxygen atom forming the heterocycle. The cyclic ester is a compound that is known collectively as lactone.

Examples of the cyclic ester having a simple structure include β-propiolactone, β-butyrolactone, γ-butyrolactone, γ-valerolactone, γ-caprolactone, σ-valerolactone, and ε-caprolactone. The number of ring member of the heterocycle of the cyclic ester is not particularly limited. Furthermore, for example, an arbitrary side chain may be bonded to a ring member of the heterocycle. These cyclic esters may be used alone or in combination of two or more.

From the viewpoint of further enhancing the abrasion resistance of an image formed by the ink composition of the embodiment, among the cyclic esters exemplified above, 3- to 7-membered cyclic esters are preferred, and 5- or 6-membered cyclic esters are more preferred. In any of these cases, more preferably, the cyclic esters do not have side chains. Examples of such a cyclic ester include β-butyrolactone, γ-butyrolactone, and γ-valerolactone. In particular, these cyclic esters have high affinity to polyvinyl chloride and, thereby, can notably provide an effect of enhancing the abrasion resistance of an image formed on a recording medium containing polyvinyl chloride.

The content "a" of the cyclic ester must be 6% by mass or more and 30% by mass or less based on the total mass of the ink composition and is preferably 10% by mass or more and 20% by mass or less and more preferably 12% by mass or more and 16% by mass or less. A content of the cyclic ester within the above-mentioned range can satisfactorily secure the abrasion resistance of recorded images. In contrast, a content of the cyclic ester of less than 6% by mass deteriorates the abrasion resistance of recorded images, and a content exceeding 30% by mass tends to cause a reduction in image quality by a decrease in wet-spreading property of images to be recorded or deterioration of glossiness.

1.2.2. First Organic Solvent

The ink composition according to the embodiment contains, as a solvent, a first organic solvent having a flash point of 70° C. or less and represented by Formula (I):

$$R^1-O-(R^2-O)_2-R^3 \qquad (I).$$

Since the first organic solvent has a flash point of 70° C. or less, the drying property thereof is excellent. This can improve the drying property of images to be recorded.

In Formula (I), $R^1$ represents an alkyl group having 1 to 4 carbon atoms; $R^2$ represents an ethylene group or a propylene group; and $R^3$ represents a hydrogen atom or an alkyl group having 1 to 4 carbon atoms. The alkyl group having 1 to 4 carbon atoms can be a linear or branched alkyl group, and examples thereof include a methyl group, an ethyl group, an n-propyl group, an iso-propyl group, an n-butyl group, a sec-butyl group, and a tert-butyl group.

The compounds represented by Formula (I) may be used alone or in combination of two or more thereof. As shown in Formula (I), the first organic solvent is an alkylene glycol alkyl ether. When the ink composition contains a fixing resin described below, the alkylene glycol alkyl ether can well dissolve the fixing resin.

Examples of the compound having a flash point of 70° C. or less and represented by Formula (I) include diethylene glycol methyl ethyl ether (64° C.), diethylene glycol dimethyl ether (56° C.), and dipropylene glycol dimethyl ether (65° C.) These compounds may be used alone or in combination of two or more thereof. The numerical values in parentheses show the flash points.

The flash point of the solvent according to the embodiment is a flash point measured with a Cleveland open cup flash point tester when the flash point measured with a tag closed cup flash point tester is higher than 80° C.; a flash point measured with a tag closed cup flash point tester when the flash point measured with a tag closed cup flash point tester is 80° C. or less and the kinematic viscosity of the solvent at the flash point is less than 10 cSt; and a flash point measured with a SETA closed cup flash point tester when the flash point measured with a tag closed cup flash point tester is 80° C. or less and the kinematic viscosity of the solvent at the flash point is 10 cSt or more.

The flash point of the first organic solvent must be 70° C. or less and is preferably 50° C. or more and 70° C. or less, more preferably 55° C. or more and 70° C. or less, more preferably 60° C. or more and 70° C. or less, and most preferably 62° C. or more and 68° C. or less. A flash point of 70° C. or less shows a satisfactory effect of improving the drying property of the ink composition. A flash point of 50° C. or more provides an excelling drying property while inhibiting the wet-spreading property of the ink composition from decreasing.

The first organic solvent may be added to the ink composition such that Expressions (1) and (2) described below are satisfied. From the viewpoint of inhibiting the wet-spreading property of the ink composition from decreasing while further improving the drying property of an image to be recorded, the content "b" is preferably 20% by mass or more and 85% by mass or less based on the total mass of the ink composition. The lower limit is preferably 30% by mass or more and more preferably 40% by mass or more. The upper limit is preferably 80% by mass or less, more preferably 75% by mass or less, more preferably 70% by mass or less, and most preferably 60% by mass or less.

1.2.3. Second Organic Solvent

The ink composition according to the embodiment contains a second organic solvent having a flash point of 90° C. or more as a solvent. Since the second organic solvent has a flash point of 90° C. or more, the second organic solvent has a drying property lower than that of the first organic solvent, but has a function of improving the wet-spreading property of the ink composition adhered to a recording medium. This allows an image to be recorded to be satisfactorily filled with ink droplets and thereby allows the image to have excellent image quality with less linear unevenness.

Examples of the second organic solvent include alkylene glycol alkyl ethers, higher fatty acid esters, dibasic acid diesters, and alkylamides. These compounds may be used alone or in combination of two or more thereof. Among these compounds, alkylene glycol alkyl ethers are preferred from the viewpoint of inhibiting occurrence of printing unevenness.

Throughout the specification, the term "printing unevenness (aggregation unevenness)" refers to local density spots occurring when ink droplets adhere to a recording medium and is a phenomenon that is observed when solid components (such as a resin component and a coloring material) have an uneven thickness. Throughout the specification, the term "linear unevenness" refers to a phenomenon that a linear portion that is not coated or ununiformly coated with ink droplets is formed on the surface of a recording medium due to a fault in filling the surface of the recording medium with ink droplets.

The alkylene glycol alkyl ether is preferably a compound represented by Formula (II):

$$R^4-O-(R^5-O)_n-R^6 \quad (II).$$

The compounds represented by Formula (II) may be used alone or in combination of two or more thereof.

In Formula (II), $R^4$ represents an alkyl group having 1 to 6 carbon atoms; $R^5$ represents an ethylene group or a propylene group; $R^6$ represents a hydrogen atom or an alkyl group having 1 to 6 carbon atoms; and n represents an integer of 2 to 6. The "alkyl group having 1 to 6 carbon atoms" can be a linear or branched alkyl group, and examples thereof include, in addition to the "alkyl group having 1 to 4 carbon atoms", linear or branched pentyl and hexyl groups.

In Formula (II), when both $R^4$ and $R^6$ are alkyl groups having 1 to 6 carbon atoms, the dispersion stability of the pigment in the ink composition tends to be improved. Such an alkylene glycol alkyl ether is therefore preferred. When $R^6$ represents a hydrogen atom, the alkylene glycol alkyl ether used as the second organic solvent tends to have a higher flash point, and the ink composition can obtain the effect of improving the image quality with a smaller amount of the second organic solvent, shows a tendency of further increasing the image quality, and increases the flexibility in design of the composition. Such an alkylene glycol alkyl ether is therefore preferred.

Examples of the compound having a flash point of 90° C. or more and represented by Formula (II) include diethylene glycol monomethyl ether (105° C.), diethylene glycol monoisobutyl ether (112° C.), diethylene glycol monoisopropyl ether (101° C.), diethylene glycol monohexyl ether (141° C.), diethylene glycol butyl methyl ether (94° C.), diethylene glycol dibutyl ether (122° C.), dipropylene glycol monopropyl ether (108° C.), dipropylene glycol monobutyl ether (117° C.), triethylene glycol monomethyl ether (139° C.), triethylene glycol monobutyl ether (156° C.), triethylene glycol dimethyl ether (111° C.), tripropylene glycol monomethyl ether (123° C.), tripropylene glycol monobutyl ether (138° C.), tripropylene glycol dimethyl ether (104° C.), tetraethylene glycol monobutyl ether (166° C.), and tetraethylene glycol dimethyl ether (141° C.) These compounds may be used alone or in combination of two or more thereof. The numerical values in parentheses show the flash points.

Examples of the higher fatty acid ester having a flash point of 90° C. or more include methyl laurate (136° C.), isopropyl hexadecanoate (isopropyl palmitate, 110° C.), isopropyl myristate (161.7° C.), methyl oleate (113° C.), and ethyl oleate (163° C.). These compounds may be used alone or in combination of two or more thereof. The numerical values in parentheses show the flash points.

The dibasic acid diester having a flash point of 90° C. or more is preferably a diester obtained by diesterification of an aliphatic hydrocarbon dicarboxylic acid having 2 to 8 carbon atoms (excluding the carbon atoms of the carboxyl group) with an alkyl group having 1 to 5 carbon atoms. Examples of the dibasic acid diester having a flash point of 90° C. or more include dimethyl glutarate (107° C.).

The alkylamide having a flash point of 90° C. or more is preferably an amide obtained by amidation of an aliphatic hydrocarbon monocarboxylic acid having 6 to 10 carbon atoms (excluding the carbon atoms of the carboxyl group) wherein the substituents on the amide nitrogen atom are each independently a hydrogen atom or an alkyl group having 1 to 4 carbon atoms. Examples of the alkylamide having a flash point of 90° C. or more include N,N-dimethyl decanamide (110° C. or more).

The flash point of the second organic solvent must be 90° C. or more and is preferably 100° C. or more and 175° C. or less, more preferably 100° C. or more and 170° C. or less, and most preferably 130° C. or more and 170° C. or less. A flash point of 90° C. or more shows a satisfactory effect of improving the wet-spreading property of the ink composition. A flash point of 175° C. or less provides good balance between the wet-spreading property and the drying property of the ink composition.

The second organic solvent may be added to the ink composition such that Expressions (1) and (2) described below are satisfied. From the viewpoint of inhibiting the drying property from decreasing while further improving the wet-spreading property of an image to be recorded, the content "c" is preferably 3% by mass or more and 30% by mass or less based on the total mass of the ink composition. The lower limit is preferably 5% by mass or more, more preferably 7% by mass or more, more preferably 10% by mass or more, and most preferably 15% by mass or more. The upper limit is preferably 25% by mass or less and more preferably 20% by mass or less.

1.2.4. Other Solvents

The ink composition according to the embodiment can contain various organic solvents that are not classified into the cyclic ester, the first solvent, and the second solvent. For example, the ink composition can further contain an ester solvent, a ketone solvent, an alcohol solvent, an amide solvent, or an alkylene glycol alkyl ether (e.g., diethylene glycol diethyl ether).

1.2.5. Quantity Relationship of Each Solvent

If the cyclic ester, the first organic solvent, and the second organic solvent are merely contained in the ink composition, the functions of the solvents may be cancelled to each other, and each solvent may not sufficiently exhibit its intrinsic function.

Surprisingly, the present inventors have found that the ink composition that can record an image having excellent abrasion resistance and showing good balance between the image quality and the drying property by complementary and synergistic actions of each component by adjusting the content "a" of the cyclic ester within a specific range and controlling the content "a" (% by mass) of the cyclic ester, the content "b"

(% by mass) of the first organic solvent, and the content "c" (% by mass) of the second organic solvent so as to satisfy a specific relationship.

That is, in the ink composition according to the embodiment, the content "a" of the cyclic ester is 6% by mass or more and 30% by mass or less, and the content "a" (% by mass) of the cyclic ester, the content "b" (% by mass) of the first organic solvent, and the content "c" (% by mass) of the second organic solvent satisfy a relationship represented by Expressions (1) and (2):

$$a<b \tag{1}$$

$$c<(a+b)/2 \tag{2}.$$

As a result, the solvents can sufficiently exhibit their respective functions, and the resulting image can have excellent abrasion resistance and good balance between the image quality and the drying property.

On the other hand, if Expression (1) is not satisfied, that is, the relationship between the content "a" and the content "b" is represented by a b, the wet-spreading property and glossiness of the image to be recorded tend to reduce to deteriorate the image quantity.

If Expression (2) is not satisfied, that is, the relationship among the content "a", the content "b", and the content "c" is represented by c≥(a+b)/2, the image to be recorded tends to cause printing unevenness and a reduction in drying property to lose the balance between the image quality and the drying property.

Furthermore, if the content "a" (% by mass) of the cyclic ester and the content "c" (% by mass) of the second organic solvent satisfy a relationship represented by Expression (3):

$$a<c \tag{3},$$

the dot size and glossiness tend to be further enhanced. Such an ink composition is therefore preferred.

1.3. Other Components

The ink composition according to the embodiment may further contain components other than the above-mentioned components.

Water

The ink composition of the embodiment preferably does not contain water, but may be contain water. If the ink composition contains water, the content of water is preferably 5% by mass or less, more preferably 3% by mass or less, more preferably 1% by mass or less, more preferably less than 0.05% by mass, more preferably less than 0.01% by mass, more preferably less than 0.005% by mass, and further preferably less than 0.001% by mass, based on the total mass of the ink composition. The ink composition according to the embodiment may substantially not contain water. The term "substantially not contain" refers to that water is not purposely added. That is, the ink composition according to the embodiment is preferably a nonaqueous ink composition in which an organic solvent is the main solvent and water is not the main solvent.

Fixing Resin

The ink composition of the embodiment may contain a fixing resin. Examples of the fixing resin that can be contained in the ink composition include aliphatic polyesters, aromatic polyesters, polyurethane, polyvinyl chloride, epoxy resins, polyvinyl acetate, vinyl chloride-vinyl acetate copolymer resins, ethylene-vinyl acetate copolymer resins, polycarbonates, polyvinyl butyrals, polyvinyl alcohols, phenoxy resins, ethyl cellulose resins, cellulose acetate propionate resins, cellulose acetate butyrates, nitrocellulose resins, polystyrenes, poly(meth)acrylic acid, methyl poly(meth)acrylate, ethyl poly(meth)acrylate, (meth)acrylic acid-(meth)acrylate copolymer resins, styrene-(meth)acrylic copolymer resins, vinyltoluene-α-methyl styrene copolymer resins, polyamides, polyimides, polysulfone resins, petroleum resins, ethylene-(meth)acrylic acid copolymer resins, ethylene-(meth)acrylate copolymer resins, chlorinated-polypropylenes, polyolefins, ethylene alkyl(meth)acrylate resins, terpene resins, rosin-modified phenol resins, various types of synthetic rubbers such as NBR/SBR/MBR, and modified products thereof. These resins may be used alone or in combination of two or more thereof. These fixing resins can be blended to the ink composition for, for example, enhancing the fixability of the ink composition onto a recording medium.

Examples of the fixing resin include Acrypet MF (acrylic resin, manufactured by Mitsubishi Rayon Co., Ltd.), Sumipex LG (acrylic resin, manufactured by Sumitomo Chemical Company), Paraloid B series (acrylic resin, manufactured by Rohm and Haas Company), and Parapet G-1000P (acrylic resin, manufactured by Kuraray Co., Ltd.). Among these fixing resins, in particular, (meth)acrylic resins and vinyl chloride resins are preferred from the viewpoint of the abrasion resistance. The (meth)acrylic resin contains at least any of (meth)acrylate and (meth)acrylic acid as a monomer component used in synthesis of the resin. The vinyl chloride resin contains at least vinyl chloride as a monomer component used in synthesis of the resin.

The amount of the fixing resin blended in the ink composition of the embodiment is not particularly limited and can be, for example, preferably 0.01% by mass or more and 5% by mass or less, more preferably 0.1% by mass or more and 3% by mass or less, and most preferably 0.5% by mass or more and 2% by mass or less, for exhibiting desirable fixability.

Surfactant

The ink composition of the embodiment may contain a surfactant from the viewpoint of reducing the surface tension and thereby improving the wet-spreading property on a recording medium. Examples of the surfactant include silicon-based surfactants, fluorine-based surfactants, and polyoxyethylene derivatives as nonionic surfactants.

The silicon-based surfactant is preferably polyester-modified silicone or polyether-modified silicone, and examples thereof include BYK series 347 and 348 and BYK-UV series 3500, 3510, 3530, and 3570 (manufactured by BYK-Chemie Japan, Inc.).

The fluorine-based surfactant is preferably a fluorine-modified polymer, and examples thereof include BYK 340 (manufactured by BYK-Chemie Japan, Inc.).

The polyoxyethylene derivative is preferably an acetylene glycol surfactant, and examples thereof include Surfynol series 82, 104, 465, 485, and TG (manufactured by Air Products Japan, Inc.), Olfine series STG and E1010 (manufactured by Nissin Chemical Industry Co., Ltd.), Nissan Nonion series A-10R and A-13R (manufactured by NOF Corporation), Flowlen series TG-740W and D-90 (manufactured by Kyoeisha Chemical Co., Ltd.), and Noigen CX-100 (manufactured by Dai-ichi Kogyo Seiyaku Co., Ltd.).

Others

The ink composition of the embodiment can contain, in addition to the above-mentioned components, materials for imparting prescribed performance to the ink composition, such as an amine, a salt, a dispersant, a dispersion assistant, a polymerizable compound, another surfactant, a pH adjuster, a chelating agent such as ethylenediamine tetraacetate (EDTA), an antiseptic and fungicide, and an antirust agent.

1.4. Physical Properties

The aqueous ink composition according to the embodiment preferably has a surface tension of 20 mN/m or more and 50 mN/m or less and more preferably 25 mN/m or more and 40 mN/m or less at 20° C. from the viewpoint of the balance between the recording quality and reliability as an ink composition for ink jet recording. The surface tension can be measured with an automatic surface tensiometer CBVP-Z (manufactured by Kyowa Interface Science Co., Ltd.) in an environment at 20° C. by confirming the surface tension when a platinum plate is wetted with the ink.

From a similar viewpoint, the ink composition preferably has a viscosity of 2 mPa·s or more and 15 mPa·s or less and more preferably 2 mPa·s or more and 10 mPa·s or less at 20° C. The viscosity can be measured with a viscosity analyzer MCR-300 (manufactured by Pysica) by increasing the shear rate from 10 to 1000 in an environment at 20° C. and reading the viscosity at a shear rate of 200.

1.5. Method of Producing Ink Composition

The ink composition according to the embodiment can be produced by a known common process. For example, a pigment dispersion is prepared by mixing a coloring material, a dispersant, and (a part of) a solvent with a ball mill, a bead mill, or a jet mill or by sonication so as to have desired ink characteristics. Subsequently, (the residue of) the solvent and other additives (for example, a surfactant and a resin) are added to the mixture with stirring, followed by stirring sufficiently to give an ink composition.

2. Ink Jet Recording Method

An ink jet recording method according to an embodiment of the invention includes steps of discharging liquid droplets of the above-described ink composition from a recording head and allowing the ink composition to adhere onto a recording medium (hereinafter, also referred to as "step (a)"). This provides a recorded matter having an image formed on the recording medium.

Since the ink jet recording method according to the embodiment uses the ink composition mentioned above, the image can have excellent abrasion resistance, and also both the drying property of the image and the image quality can be improved.

Since the ink jet recording method according to the embodiment uses an ink composition having an excellent drying property as described above, a satisfactory image can be recorded even in an environment with a relative humidity of 50% RH or more at the time of recording. Such a recording method allows recording, for example, under an insufficient air conditioning environment in high-temperature and high-humidity area, climate, or weather. The upper limit of the environmental humidity is preferably 100% RH or less and more preferably 90% RH or less. The environmental temperature is preferably 25° C. or more and more preferably 25° C. to 40° C. The environmental temperature and humidity can be measured with, for example, a temperature and humidity sensor installed inside or outside of a housing of an ink jet recording apparatus. The temperature and humidity sensor must be installed at a position where is not affected by the heat generated by the recording apparatus itself, such as a heating mechanism for heating a recording medium described below, for precisely measuring the environmental temperature and humidity.

In the ink jet recording method according to the embodiment, the step (a) is preferably performed by heating the recording medium to 40° C. or more and 50° C. or less. The drying property of the ink composition described above can be enhanced by allowing the ink composition to adhere onto the thus-heated recording medium. In particular, this effect is significant in a high-humidity environment.

The ink jet recording method according to the embodiment may include, after the step (a), a post-heating (after heat) for further heating the recording medium (hereinafter, also referred to as "step (b)"). The drying property of the ink in a high-humidity environment can be further enhanced by further performing the step (b).

As an ink jet recording apparatus that can perform such a step described above, any apparatus that discharges the above-described ink composition as liquid droplets from minute nozzles of a recording head and allows the liquid droplets to adhere to a recording medium can be used. As an ink jet recording apparatus usable in the embodiment, an ink jet printer having a mechanism that can heat a recording medium will now be described as an example.

FIG. 1 is a perspective view illustrating a structure of an ink jet printer (hereinafter, simply referred to as "printer") that can be used in the embodiment. The printer 1 shown in FIG. 1 is a so-called serial printer. A serial printer is a printer in which a recording head is mounted on a carriage that moves in a predetermined direction and liquid droplets are discharged onto a recording medium by moving of the recording head with the movement of the carriage.

As shown in FIG. 1, the printer 1 includes a carriage 4 on which a recording head 2 is mounted and an ink cartridge 3 is detachably installed; a platen 5 disposed below the recording head 2 and onto which a recording medium P is transported; a heating mechanism 6 for heating the recording medium; a carriage-moving mechanism 7 for moving the carriage 4 in the medium width direction of the recording medium P; and a medium-transporting mechanism 8 for transporting the recording medium P in the medium-transporting direction. The printer 1 also has a controller CONT that controls the entire operation of the printer 1. The medium width direction is the main-scanning direction (head scanning direction). The medium-transporting direction is the sub-scanning direction (direction orthogonal to the main-scanning direction).

The ink cartridge 3 is composed of four independent cartridges. The four cartridges are each filled with the above-described ink composition. In the example shown in FIG. 1, four cartridges are mounted, but the number of cartridges is not limited thereto, and a desired number of cartridges can be mounted.

The ink cartridge 3 is not limited to one that is installed to the carriage 4 as shown in FIG. 1. Instead of this, for example, the ink composition may be supplied to the head 2 via an ink-supplying tube installed to the housing of the printer 1.

The carriage 4 is supported by a guide rod 9, which is a supporting member installed in the main-scanning direction. The carriage 4 is moved by the carriage-moving mechanism 7 in the main-scanning direction along the guide rod 9. In the example shown in FIG. 1, the carriage 4 moves in the main-scanning direction, but the movement is not limited thereto, and the carriage may be move in the sub-scanning direction in addition to the main-scanning direction.

The heating mechanism 6 may be disposed at any position as long as the recording medium P can be heated. In the example shown in FIG. 1, the heating mechanism 6 is disposed on the platen 5 so as to face the head 2. The heating mechanism 6 disposed at a position facing the head 2 can certainly heat the positions, onto which liquid droplets adhere, of the recording medium P and thereby can efficiently dry the liquid droplets adhered to the recording medium P.

The heating mechanism 6 can be, for example, a print-heating mechanism performing heating by bringing the recording medium P into contact with a heat source, a mechanism performing heating by irradiating infrared rays or microwaves (electromagnetic waves having a maximum wavelength at about 2450 MHz), or a dryer mechanism performing heating by blowing hot air.

The heating of the recording medium P by the heating mechanism 6 is performed before or at the time of adhesion of liquid droplets discharged from nozzle holes (not shown) onto the recording medium P. By doing so, the liquid droplets adhered to the recording medium P can be quickly dried. The conditions for heating (for example, timing of performing the heating, heating temperature, and heating time) are controlled by the controller CONT.

The recording medium P is preferably heated with the heating mechanism 6 such that the temperature of the recording medium P is maintained within a range of 40° C. or more and 50° C. or less from the viewpoint of enhancing the drying property of an ink, preventing deformation of the recording medium, improving the abrasion resistance, and improving the stability of intermittent discharging. Throughout the specification, the temperature of heating a recording medium refers to the temperature of the surface of a recording medium at the time of heating.

The printer 1 may further include a second heating mechanism (not shown) other than the heating mechanism 6. A printer 1 having the second heating mechanism can perform the step (b) by itself. The second heating mechanism is disposed at the downstream of the heating mechanism 6 in the transporting direction of the recording medium P. The second heating mechanism heats the recording medium P after the heating of the recording medium P by the heating mechanism 6, i.e., after adhesion of liquid droplets discharged from the nozzle hole (not shown) to the recording medium P. By doing so, the drying of the liquid droplets of the ink composition adhered to the recording medium P can be further enhanced. As the second heating mechanism, any of the mechanisms described for the heating mechanism 6 (for example, a dryer mechanism) can be used.

The recording medium P is preferably heated with the second heating mechanism such that the temperature of the recording medium P is maintained within a range of 40° C. or more and 50° C. or less by the same reasons above. If the temperature of the recording medium P exceeds 50° C., defects such as deformation of the recording medium P or shrinkage in recorded image during heating and cooling of the recording medium P occur in some cases. In addition, since disadvantages such as an increase in power consumption of the heater used for heating and an increase in exhaust heat from the printer by the heating mechanism are caused, the upper limit of the temperature of the recording medium is preferably 50° C.

A linear encoder 10 detects the position of the carriage 4 in the main-scanning direction with a signal. The signal detected is sent to the controller CONT as positional information. The controller CONT recognizes the scanning position of the recording head 2 based on the positional information from the linear encoder 10 and controls, for example, the recording operation (discharge operation) by the recording head 2. The controller CONT can variably control the moving speed of the carriage 4.

The recording medium P is not particularly limited. The ink jet recording method according to the embodiment can record images and letters with satisfactory abrasion resistance and drying property even on a low-absorptive recording medium. Herein, the term "low-absorptive recording medium" refers to a recording medium absorbing 10 mL/m$^2$ or less of water within 30 msec$^{1/2}$ from the start of contact with water when measured by a Bristow method. At least the recording surface may have such a property. In this definition, examples of the "low-absorptive recording medium" in the invention include non-absorptive recording media that do not absorb water at all. The Bristow method is most commonly used as a method for measuring the amount of liquid absorbed in a short period of time and is also employed by Japan Technical Association of the Pulp and Paper Industry (JAPAN TAPPI). The details of the test method are described in Standard No. 51 "Paper and Paperboard—Liquid Absorbency Test Method—Bristow Method" in "JAPAN TAPPI Paper and Pulp Test Methods, 2000 Edition".

Examples of the low-absorptive recording medium include sheets, films, and fiber products containing low-absorptive materials. The low-absorptive recording medium may be composed of a base material (for example, paper, fiber, leather, plastic, glass, ceramics, or a metal) and a layer containing a low-absorptive material (hereinafter, also referred to as "low-absorptive layer") disposed on the surface. The low-absorptive material is not particularly limited, and examples thereof include olefin resins, ester resins, urethane resins, acrylic resins, and vinyl chloride resins.

Among these media, a medium having a recording surface containing a vinyl chloride resin can be preferably used as the low-absorptive recording medium. The ink composition described above contains a cyclic ester. The cyclic ester dissolves the recording surface containing the vinyl chloride resin and thereby allows the ink composition to penetrate into the inside of the recording medium. As a result, the abrasion resistance of the images and letters recorded on the recording surface containing the vinyl chloride resin can be improved even in a high-humidity environment. Examples of the vinyl chloride resin include polyvinyl chloride, vinyl chloride-ethylene copolymers, vinyl chloride-vinyl acetate copolymers, vinyl chloride-vinyl ether copolymers, vinyl chloride-vinylidene chloride copolymers, vinyl chloride-maleate copolymers, vinyl chloride-(meth)acrylic acid copolymers, vinyl chloride-(meth)acrylate copolymers, and vinyl chloride-urethane copolymers. The characteristics of the low-absorptive recording medium, such as thickness, shape, color, softening temperature, and hardness, are not particularly limited.

3. Example

The invention will now be more specifically described by examples and comparative examples, but the invention is not limited thereto.

3.1. Preparation of Ink Composition

Ink compositions of Examples and Comparative Examples were prepared at the blending ratios shown in Table 1.

In the components shown in Table 1, the pigment used is Pigment blue 15:3 (copper phthalocyanine pigment: manufactured by Clariant Co., Ltd.).

In the compounds shown in Table 1, the cyclic ester used is γ-butyrolactone (manufactured by Kanto Chemical Co., Ltd.).

In the components shown in Table 1, the first organic solvent used is DEGMEE (diethylene glycol methyl ethyl ether, trade name: "Hysorb EDM", manufactured by Toho Chemical Industry Co., Ltd.) or DEGdME (diethylene glycol dimethyl ether, trade name: "Diethylene Glycol Dimethyl Ether", manufactured by Tokyo Chemical Industry Co., Ltd.).

In the components shown in Table 1, the second organic solvent used is DEGBME (diethylene glycol butyl methyl ether, trade name: "Hysorb BDM", manufactured by Toho Chemical Industry Co., Ltd.), or TetraEGmBE (tetraethylene glycol monobutyl ether, trade name: "Butycenol 40", manufactured by KH Neochem Co., Ltd.).

In the components shown in Table 1, the "other solvent" used is DEGDEE (diethylene glycol diethyl ether, trade name: "Diethylene Glycol Diethyl Ether", manufactured by Tokyo Chemical Industry Co., Ltd., flash point: 71° C.).

In Table 1, Solsperse 37500 (trade name, manufactured by LUBRIZOL Corporation) is a dispersant. Parapet G-1000P (manufactured by Kuraray Co., Ltd.) is an acrylic resin (fixing resin). In Table 1, BYK 340 (manufactured by BYK-Chemie Japan, Inc.) is a fluorine-based surfactant (lubricant).

The ink compositions of Examples and Comparative Examples were prepared as follows: The solvents of each ink composition were mixed at the blending ratio shown in Table 1 and were stirred to prepare a solvent mixture. Subsequently, a part of the solvent mixture was mixed with Solsperse 37500, and Pigment blue 15:3 was then added to the mixture, followed by pre-dispersing with a homogenizer and then dispersing with a bead mill to prepare a dispersion of the pigment having an average particle diameter of 130 nm. Separately, Parapet G-1000P was added to a part of the solvent mixture, and the mixture was stirred to completely dissolve Parapet G-1000P to prepare a resin solution. The remaining solvent mixture, BYK 340, and the resin solution were mixed with the dispersion to prepare an ink composition.

3.2. Evaluation Test

Evaluation tests were performed with a printer, "SC-S30650", manufactured by Seiko Epson Corporation installed in an environmental test chamber in which the temperature and the humidity were respectively adjusted to 30° C. and 55% RH with an air conditioner and a humidifier. The temperature and the humidity were measured with a temperature and humidity sensor installed on a housing so as not to be affected by the heat generated by the ink jet printer itself such as the heater.

In each evaluation test, the recording medium was heated at 45° C. at the platen and the recording medium-ejecting part positioned downstream of the platen during recording and for one minute after the recording.

3.2.1. Printing Unevenness

A solid image was printed at a recording resolution of 720×720 dpi on a vinyl chloride banner sheet (manufactured by 3M Co., Ltd., model number: IJ51 (polyvinyl chloride)) with each of the ink compositions of Examples and Comparative Examples at a concentration 100% using the above-mentioned printer. The solid image was dried for 60 minutes at 25° C. and 65% RH (relative humidity). Subsequently, the printed surface was investigated visually and with an optical microscope to evaluate the printing unevenness of the surface. The printing unevenness was evaluated with six levels from 6 points for lower printing unevenness to 1 point for higher printing unevenness. The results are shown in Table 1.

3.2.2. Glossiness

A solid image was printed at a recording resolution of 720×720 dpi on a glossy polyvinyl chloride sheet (manufactured by Roland DG Corporation, model number: SV-G-1270G) with each of the ink compositions of Examples and Comparative Examples at a concentration 100% using the above-mentioned printer. The solid image was dried for one day at 25° C. and 65% RH (relative humidity) to prepare each recorded matter. The 20° glossiness of each solid image was measured with MULTI GLOSS 268 (manufactured by Konica Minolta, Inc.). The glossiness was evaluated by giving points for each 2 degrees of glossiness in such a manner that a glossiness of less than 26 was counted as 1 point and a glossiness of 26 or more and less than 28 was counted as 2 points. The results are shown in Table 1. An image having excellent glossiness has an advantage that the recorded matter can give feeling of gloss similar to that of the recording medium itself, in particular, in a recording medium having glossiness, such as a film.

3.2.3. Dot Size

A 3 cm square image was printed at a recording resolution of 720×720 dpi on a vinyl chloride banner sheet (manufactured by 3M Co., Ltd., model number: IJ51 (polyvinyl chloride)) with each of the ink compositions of Examples and Comparative Examples at a concentration 30% using the above-mentioned printer. The image was dried for 60 minutes at 25° C. and 65% RH (relative humidity). Subsequently, the dot size of the printed image was investigated with an optical microscope. The dots were classified by the diameters for every 10 μm. In the case of showing considerable bleeding, the dot shape was not circular and thereby the dot size could not be measured. In the case of showing lower bleeding, the dot was almost a perfect circle, but the dot size (diameter) was small. The dots were classified with points, 1 point for every 10 μm, in such a manner that a dot size of 20 μm or less was counted as 1 point and a dot size of larger than 20 μm and 30 μm or less was counted as 2 points. The point of each ink composition was calculated. The results are shown in Table 1. A satisfactory dot size means a satisfactory wet-spreading property of the ink on a recording medium and allows the ink to cover the recording medium to show advantages such as an enhancement of the color development of the recorded matter.

3.2.4. Abrasion Resistance

An image was printed at a recording resolution of 720×720 dpi on a glossy polyvinyl chloride sheet (manufactured by Roland DG Corporation, model number: SV-G-1270G) with each of the ink compositions of Examples and Comparative Examples at a concentration 100% using the above-mentioned printer. The image was dried for one day at 25° C. and 65% RH (relative humidity) to prepare each recorded matter. Subsequently, a dry method was performed in accordance with JIS L 0849 with an I-type tester. Subsequently, the OD of the test cotton cloth was measured with Spectrolino (manufactured by GretagMacbeth). The color staining was classified with points, 1 point for every 0.05 of OD value, in such a manner that an OD of 0.4 or more was counted as 1 point and an OD of less than 0.4 and 0.35 or more was counted as 2 points. The results are shown in Table 1.

3.2.5. Surface Drying Property

An image was printed at a recording resolution of 720×720 dpi on a glossy polyvinyl chloride sheet (manufactured by Roland DG Corporation, model number: SV-G-1270G) with each of the ink compositions of Examples and Comparative Examples at a concentration 100% using a printer, "SC-S30650", manufactured by Seiko Epson Corporation. The image was dried for 5 minutes at 25° C. and 65% RH (relative humidity). Subsequently, the sheet was wound with a winding device, and the scratches on the printed surface were investigated by measuring the surface roughness with a laser microscope (manufactured Keyence Corporation, model: VK-8700 Generation 2). The proportion of the area having scratches was calculated. The images were classified with points, 1 point for every 10% of the proportion, in such a manner that an image in which the proportion of the scratched area to the printed area was 10% or less was counted as 5 points and an image in which the proportion was 20% or less and higher than 10% was counted as 4 points. An image having no scratches was counted as 6 points. The results are shown in Table 1.

3.3. Evaluation Results

The results of the evaluation tests are shown in Table 1.

heating temperature during the recording on a recording medium (step (a)) and after the recording (step (b)) was 55° C.

TABLE 1

| | | Example | | | | | | | | Comparative Example | | | | | | |
|---|---|---|---|---|---|---|---|---|---|---|---|---|---|---|---|---|
| Ink composition | | 1 | 2 | 3 | 4 | 5 | 6 | 7 | 8 | 1 | 2 | 3 | 4 | 5 | 6 | 7 |
| Pigment | PB-15:3 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Dispersant | Solsperse 37500 | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| Cyclic ester | GBL | 10.0 | 15.0 | 19.0 | 15.0 | 6.0 | 30.0 | 30.0 | 15.0 | 2.0 | 30.0 | 15.0 | 30.0 | 20.0 | 35.0 | 30.0 |
| First organic solvent | DEGMEE | 59.0 | 45.0 | 30.0 | 0.0 | 59.0 | 35.0 | 35.0 | 69.0 | 59.0 | 0.0 | 74.0 | 19.0 | 35.0 | 40.0 | 0.0 |
| | DEGdME | 0.0 | 0.0 | 0.0 | 45.0 | 0.0 | 0.0 | 0.0 | 0.0 | 0.0 | 0.0 | 0.0 | 0.0 | 0.0 | 0.0 | 0.0 |
| Second organic solvent | DEGBME | 0.0 | 29.0 | 20.0 | 29.0 | 0.0 | 0.0 | 0.0 | 5.0 | 0.0 | 30.0 | 0.0 | 20.0 | 34.0 | 14.0 | 0.0 |
| | TetraEGmBE | 20.0 | 0.0 | 0.0 | 0.0 | 24.0 | 24.0 | 0.0 | 0.0 | 28.0 | 29.0 | 0.0 | 0.0 | 0.0 | 0.0 | 0.0 |
| | Isopropyl hexadecanate | 0.0 | 0.0 | 0.0 | 0.0 | 0.0 | 0.0 | 24.0 | 0.0 | 0.0 | 0.0 | 0.0 | 0.0 | 0.0 | 0.0 | 0.0 |
| Other solvent | DEGDEE | 0.0 | 0.0 | 20.0 | 0.0 | 0.0 | 0.0 | 0.0 | 0.0 | 0.0 | 0.0 | 0.0 | 20.0 | 0.0 | 0.0 | 59.0 |
| Surfactant | BYK340 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Fixing resin | Parapet G-1000P | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Total (% by mass) | | 100.0 | 100.0 | 100.0 | 100.0 | 100.0 | 100.0 | 100.0 | 100.0 | 100.0 | 100.0 | 100.0 | 100.0 | 100.0 | 100.0 | 100.0 |
| (a + b)/2 | | 34.5 | 30.0 | 24.5 | 30.0 | 32.5 | 32.5 | 32.5 | 42.0 | 30.5 | 15.0 | 44.5 | 24.5 | 27.5 | 37.5 | 15.0 |
| Evaluation results | Printing unevenness | 5 | 6 | 5 | 6 | 5 | 5 | 4 | 5 | 3 | 2 | 6 | 4 | 2 | 5 | 2 |
| | Glossiness | 6 | 6 | 6 | 5 | 6 | 5 | 5 | 4 | 6 | 3 | 3 | 2 | 5 | 1 | 2 |
| | Dot size | 6 | 5 | 5 | 5 | 6 | 6 | 5 | 4 | 4 | 6 | 2 | 2 | 6 | 1 | 1 |
| | Friction fastness | 5 | 6 | 6 | 6 | 4 | 6 | 6 | 5 | 2 | 6 | 5 | 6 | 5 | 6 | 6 |
| | Surface drying property | 5 | 6 | 6 | 6 | 5 | 4 | 4 | 6 | 4 | 2 | 6 | 3 | 2 | 3 | 2 |

In all of the ink compositions according to Examples, the abrasion resistance was evaluated to be satisfactory, and the drying property and image quality (such as dot size) were evaluated to be satisfactory. Thus, it was demonstrated that the ink compositions according to Examples can provide excellent abrasion resistance and also can satisfy both a high drying property of an image and a high image quality.

On the other hand, the ink composition according to Comparative Example 1 was evaluated as being poor at least in abrasion resistance because of its low content of GBL. The ink composition according to Comparative Example 2 was evaluated as being poor at least in drying property because of the absence of the first organic solvent. The ink composition according to Comparative Example 3 was evaluated as being poor at least in dot size because of the absence of the second organic solvent. The ink composition according to Comparative Example 4 was evaluated as being poor at least in dot size because by that the relationship represented by Expressions (1) and (2) was not satisfied. The ink composition according to Comparative Example 5 was evaluated as being poor at least in drying property because by that the relationship represented by Expression (2) was not satisfied. The ink composition according to Comparative Example 6 was evaluated as being poor at least in dot size because of its excessive content of GBL. The ink composition according to Comparative Example 7 was evaluated as being poor at least in dot size and drying property because of the absence of the first organic solvent and the second organic solvent.

The results of Examples demonstrate that the use of an alkylene glycol alkyl ether as the second organic solvent tends to inhibit occurrence of printing unevenness.

The ink compositions in Example 2 and Comparative Examples 2, 5, and 7 were similarly evaluated except that the The evaluation results of the ink composition corresponding to Example 2 were the same as those in Example 2. On the other hand, in the ink compositions corresponding to Comparative Examples 2, 5, and 7, the printing unevenness was evaluated to be 3 to 4, i.e., showed a slight improvement. However, the recording medium was deformed with the heat in each Example and Comparative Examples. The results demonstrate that the invention is particularly useful when the heating temperature of recording media is 50° C. or less.

The ink compositions in Example 2 and Comparative Example 2 were similarly evaluated except that the environmental humidity during the recording was 45% RH. The evaluation results of the ink composition corresponding to Example 2 were the same as those in Example 2. On the other hand, in the ink composition corresponding to Comparative Example 2, the printing unevenness was evaluated to be 3 to 4, i.e., showed a slight improvement. However, the direction discharging the ink droplets shifted from the correct direction in each Example and Comparative Example. The results demonstrate that the invention is particularly useful when the environmental humidity during recording is 50% RH or more.

The invention is not limited to the above-described embodiments, and various modifications are possible. For example, the invention includes compositions that are substantially the same as those described in the embodiments (for example, a composition having the same function, method, and result, or a composition having the same object and effect). The invention includes compositions in which portions not essential in the compositions described in the embodiments are replaced with others. The invention also includes compositions that can achieve the same functions and effects or the same objects as those of the compositions described in the embodiments. The invention includes compositions in which known technology is added to the compositions described in the embodiments.

The entire disclosure of Japanese Patent Application No. 2013-099070, filed May 9, 2013 and No. 2014-009249, filed Jan. 22, 2014 are expressly incorporated by reference herein.

What is claimed is:

1. An ink composition for ink jet recording comprising:
   a coloring material,
   a cyclic ester,
   a first organic solvent having a flash point of 70° C. or less and represented by Formula (I):

$$R^1\text{—}O\text{—}(R^2\text{—}O)_2\text{—}R^3 \quad (I)$$

(wherein, $R^1$ represents an alkyl group having 1 to 4 carbon atoms; $R^2$ represents an ethylene group or a propylene group; and $R^3$ represents a hydrogen atom or an alkyl group having 1 to 4 carbon atoms), and
   a second organic solvent having a flash point of 90° C. or more, wherein
   the cyclic ester has a content "a" (% by mass) of 6% by mass or more and 30% by mass or less; and
   the ink composition contains the cyclic ester in a content of "a" (% by mass), the first organic solvent in a content of "b" (% by mass), and the second organic solvent in a content of "c" (% by mass) such that the contents "a", "b", and "c" satisfy a relationship represented by Expressions (1) and (2):

$$a<b \quad (1)$$
   $$c<(a+b)/2 \quad (2).$$

2. The ink composition for ink jet recording according to claim 1, wherein the content "c" of the second organic solvent is 3% by mass or more and 30% by mass or less.

3. An ink jet recording method comprising:
   discharging an ink composition according to claim 2 from a recording head and allowing the ink composition to adhere onto a recording medium.

4. The ink composition for ink jet recording according to claim 1, wherein the content "b" of the first organic solvent is 20% by mass or more and 85% by mass or less.

5. An ink jet recording method comprising:
   discharging an ink composition according to claim 4 from a recording head and allowing the ink composition to adhere onto a recording medium.

6. The ink composition for ink jet recording according to claim 1, wherein the second organic solvent is a compound represented by Formula (II):

$$R^4\text{—}O\text{—}(R^5\text{—}O)_n\text{—}R^6 \quad (II)$$

(wherein, $R^4$ represents an alkyl group having 1 to 6 carbon atoms; $R^5$ represents an ethylene group or a propylene group; $R^6$ represents a hydrogen atom or an alkyl group having 1 to 6 carbon atoms; and n represents an integer of 2 to 6).

7. An ink jet recording method comprising:
   discharging an ink composition according to claim 6 from a recording head and allowing the ink composition to adhere onto a recording medium.

8. The ink composition for ink jet recording according to claim 1, comprising water in an amount of 3% by mass or less.

9. An ink jet recording method comprising:
   discharging an ink composition according to claim 8 from a recording head and allowing the ink composition to adhere onto a recording medium.

10. The ink composition for ink jet recording according to claim 1, wherein the contents "a" and "c" satisfy a relationship represented by Expression (3):

$$a<c \quad (3).$$

11. An ink jet recording method comprising:
    discharging an ink composition according to claim 10 from a recording head and allowing the ink composition to adhere onto a recording medium.

12. An ink jet recording method comprising:
    discharging an ink composition according to claim 1 from a recording head and allowing the ink composition to adhere onto a recording medium.

13. The ink jet recording method according to claim 12, wherein the recording medium is heated at 40° C. or more and 50° C. or less during the adhesion of the ink composition to a recording medium.

14. The ink jet recording method according to claim 12, wherein the recording is performed in an environment with a humidity of 50% RH or more.

15. The ink jet recording method according to claim 12, wherein the recording medium is heated at 40° C. or more and 50° C. or less during the adhesion of the ink composition to a recording medium, and the recording is performed in an environment with a humidity of 50% RH or more.

* * * * *